United States Patent [19]

Petin et al.

[11] 4,108,138
[45] Aug. 22, 1978

[54] COOKING OVEN AND METHOD OF MANUFACTURE

[75] Inventors: Christian Petin, 8 The Hemlocks, Roslyn Estates, N.Y. 11576; Robert Richardson, Glen Head, N.Y.

[73] Assignee: Christian Petin, Roslyn Estates, N.Y.

[21] Appl. No.: 701,564

[22] Filed: Jul. 1, 1976

[51] Int. Cl.² .............................................. A21B 1/28
[52] U.S. Cl. .................................. 126/19 R; 99/447; 126/8
[58] Field of Search ........... 126/8, 19 R, 25 R, 273 R, 126/273.5, 29, 9 R; 99/447, 467, 482; 110/1 R; 52/80, 81, 82; 264/30; 432/3

[56] References Cited

U.S. PATENT DOCUMENTS

| | | | |
|---|---|---|---|
| 34,540 | 2/1862 | Wassenich | 126/9 R |
| 125,439 | 4/1872 | Chatain | 126/9 R |
| 259,896 | 6/1882 | Miller | 126/9 R |
| 434,023 | 8/1890 | Middleby | 126/19 |
| 1,622,431 | 3/1927 | Feigenbaum | 126/8 X |
| 3,284,969 | 11/1966 | Walters et al. | 52/81 X |
| 3,756,140 | 9/1973 | Kolivas | 126/8 X |

FOREIGN PATENT DOCUMENTS

| | | | |
|---|---|---|---|
| 16,623 | 6/1881 | Fed. Rep. of Germany | 126/29 |
| 406,550 | 12/1943 | Italy | 126/9 R |

*Primary Examiner*—William F. O'Dea
*Assistant Examiner*—Harold Joyce
*Attorney, Agent, or Firm*—Lee C. Robinson, Jr.

[57] ABSTRACT

A cooking oven is made with a flat base of refractory material and a dome of refractory material forming an enclosure in which solid fuel is burned while resting directly on the base and food is also cooked directly on the base. An opening is provided in the dome wall through which fuel and food can be separately inserted within the oven. Only a relatively small part of the dome is removed to form the opening, which extends only part way up the full height of the dome. A flue is located just outside the opening so that combustion products from the fuel pass generally horizontally through the enclosed space and out the opening and up the flue. A closure is provided to shut the opening to limit the escape of heat. The dome is made by casting hemispherical sectors of refractory material and assembling the sectors into a dome on the base. The sectors are formed with interlocking edges to help hold them together and the entire dome can be enclosed within an insulated chamber..

3 Claims, 4 Drawing Figures

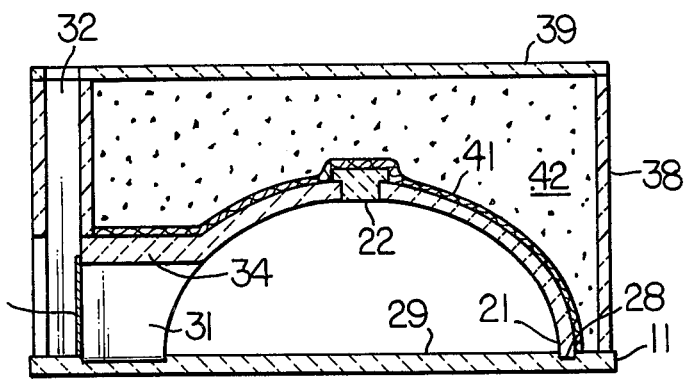
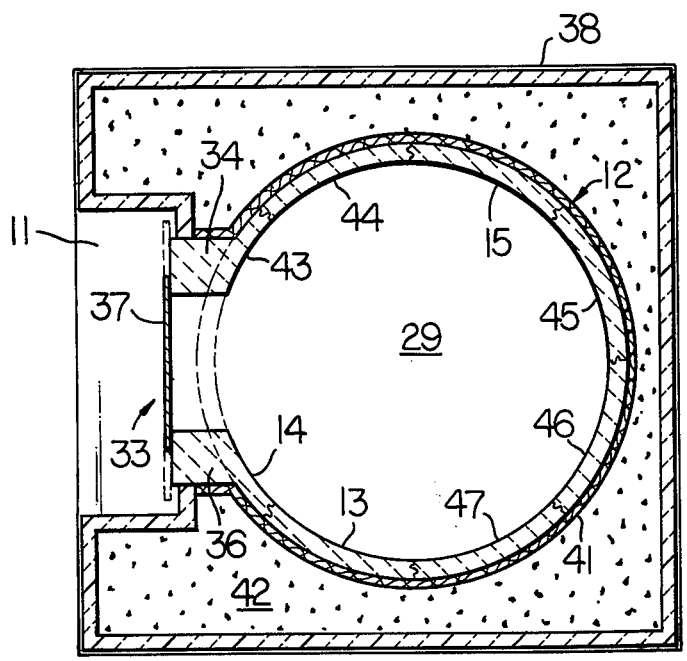
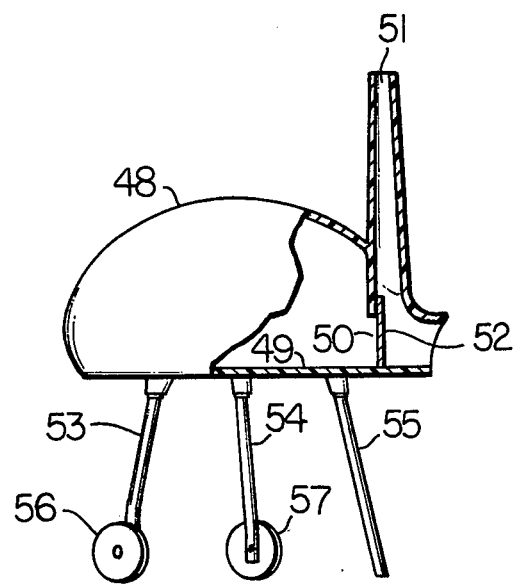

COOKING OVEN AND METHOD OF MANUFACTURE

BACKGROUND OF THE INVENTION

1. Field of the Invention

This invention relates to an oven that has a dome over a flat surface on which solid fuel is burned and on which food is cooked. The invention also relates to a method of manufacturing such an oven.

2. The Prior Art

The usual practice in ovens is to apply heat to the outside of the oven in order to heat up the air within the oven to cook the food. In structures, such as stoves, fireplaces, and other devices that have a partially enclosed space within which solid fuel is burned, the surface on which the fuel rests is not the surface on which the food is directly placed to be cooked. Such cooking structures have not obtained the advantage of directly heating a cooking surface from burning solid fuel and then placing the food to be cooked directly on that surface. Furthermore, cooking structures in the past have not enclosed the combustion space under a dome that reflects heat from the burning solid fuel back onto a base surface that is then used as a cooking surface.

SUMMARY OF THE INVENTION

In accordance with the present invention an oven is provided that consists, basically, of a dome of refractory material supported by a substantially flat, smooth, refractory base. The base is both the cooking surface and the surface that supports solid fuel to be burned to produce the cooking heat. The dome holds the heat in close proximity to the cooking surface, and in addition, reflects or reradiates heat to the cooking surface. The dome has an opening in a limited area of its wall surface starting at the base and extending only part way up the wall of the dome. A flue is located just outside the opening and extends upwardly from a point near the upper edge of the opening to draw the combustion products away from the opening and prevent them from being disbursed directly into the space in front of the oven.

The oven is heated by burning solid fuel, such as logs, within the oven. The burning logs can be pushed against the side of the cooking surface adjacent the wall to leave a clear surface area on which the food can be cooked. Combustion products from the burning fuel flow in a generally horizontal direction in the space between the dome and the base so that they can emerge through the opening and are drawn up through the flue.

In order to form a dome of a size sufficient to meet commercial requirements, this invention includes a method of forming the dome by molding hemispherical sectors and then transporting the finished sectors to the oven site and assembling them into a dome. The sectors are formed with interlocking edges to facilitate the assembly and to make the joints between sectors easier to seal together into an air-tight structure. The assembly of the sectors may be further simplified by forming the base with an annular or C-shaped groove into which one edge of the sectors can be inserted as the sectors are being assembled to form the complete dome.

BRIEF DESCRIPTION OF THE DRAWINGS

FIG. 2 is a cross sectional side view of the oven and enclosure in FIG. 1.

FIG. 3 is a cross sectional plan view of the oven and enclosure in FIGS. 1 and 2.

FIG. 4 is a side view of a portable oven according to this invention.

DETAILED DESCRIPTION OF THE INVENTION

Figure 1:
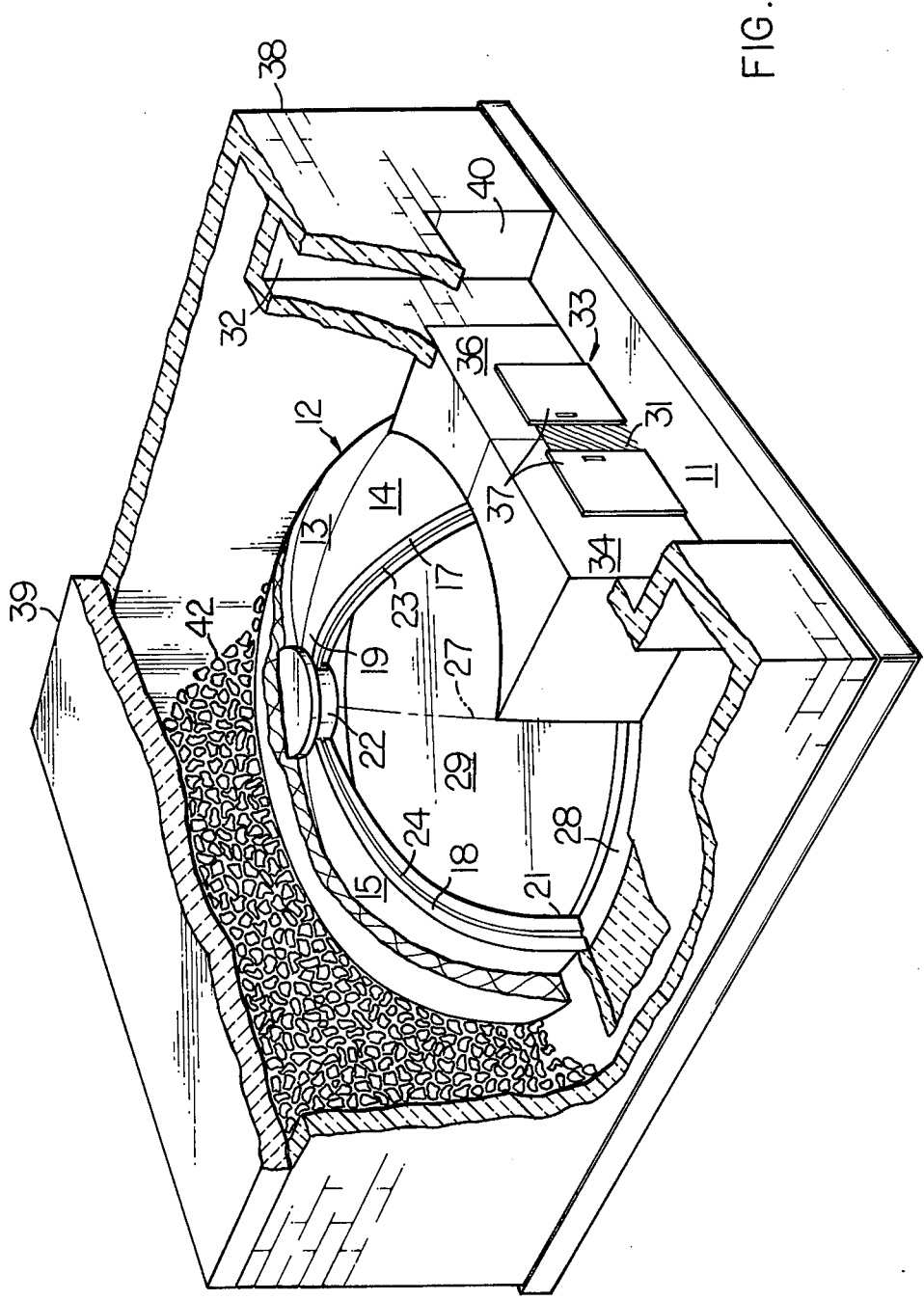
FIG. 1 is a perspective view of an oven and enclosure according to the invention with parts of the structure broken away.

In the perspective view of the oven of this invention in FIG. 1, sections of the structure have been removed to make some of the interior parts visible. The oven is built on a base, or hearth, 11 of suitable material having refractory qualities, such as a 5 inch layer of Moldit D with metal fibers embedded in it. The base would normally be formed, or poured, at the site of the oven, and a typical size for the base is approximately 8 feet square, although this size can be varied and should not be considered as limiting the invention.

The oven also includes a dome 12 that has a generally hemispherical shape. It is desirable that the highest part of the dome not be too far above the surface of the base 11, and so the hemisphere preferably is half of an oblate spheroid. A dome 12 about 5 feet in diameter is quite heavy, and one of the advantages of this invention is a construction method by which the dome is built of several precast sectors, of which the sectors 13–15 are illustrated in FIG. 1. These sectors are defined by hemispherically longitudinal edges such as the edge 17 of the sector 14 and the edge 18 of the sector 15. These edges extend from a narrow end 19 to a larger end that is equivalent to the equator of the dome. One corner of the larger end 21 of the sector 15 is shown in the drawing. The narrow ends of all of the sectors making up the dome 12 engage a plug 22 at the top of the dome, and all of the joints between abutting sectors and between the narrow ends of the sectors and the plug are sealed together by fire-resistant mortar. The thickness of the sectors of the dome may typically be of the order of 4 inches. The longitudinal edges 17 and 18 illustrate an interlocking tongue and groove configuration, which is a suitable convoluted configuration to assist in holding the sectors in place and sealing the joints between adjacent sectors. A tongue 23 is shown at the edge 17 of the sector 14, and the groove 24 is shown at the edge 18 of the sector 15. As indicated by a broken line 27 there are actually two sectors missing between the sectors 14 and 15 to allow the interior of the oven to be seen. The base 11 has a round groove 28 in it. The groove 28 may be C-shaped or completely circular. The large end of each of the sectors in the dome 12 fits into the groove, which helps hold the sectors in place.

An area 29 of the base 11 under the dome 12 is both a cooking surface and a surface on which solid fuel, such as logs, may be burned to produce the necessary heat for cooking. The temperature may be as high as about 900° F. In order to place the fuel and food to be cooked in the oven, an opening 31 is formed in the wall of the dome. This opening extends from the surface of the base 11 part way up the dome but not all the way to the top of the dome. A flue 32, of which only a fragment is shown, extends upwardly adjacent the dome 12 and just outside the opening 31. The placement of the flue makes it necessary for combustion products produced by the burning fuel on the cooking surface 29 to be drawn in a generally horizontal direction across the space between the cooking surface 29 and the dome 12 to emerge through the opening 31 and pass upwardly through the flue 32. Some of the heat produced by the burning fuel heats the cooking surface 29 directly. Additional heat from the fuel radiates to the dome and is reflected back by the inner surface of the dome to add to the heat received by the cooking surface 29.

The oven structure includes an entrance way 33 in front of the opening 31. This entrance way is, in effect, a short tunnel defined by a pair of wall sections 34 and 36 on each side of the opening. The outermost part of the entrance way 33 constitutes the effective opening into the space under the dome 12. A closure 37, illustrated as a pair of sliding doors is movably placed across the entrance way so that, in one position, the closure 37 can substantially seal off the opening 31 between the interior part of the oven and the flue 32. In another position, the closure 37 can be open to permit fuel and food to be placed on the cooking surface 29. The actual placement of the food and fuel is done in such a way that the two do not come into contact with each other; the burning fuel is perferably banked against the inner surface of the dome 12 to leave a clear area in the center and near the entrance way for the food. The fact that the fuel is burned on the same surface that is then used to cook the food is beneficial in making maximum use of the heat produced by the fuel. The fact that some of the heat is radiated or reflected back to the cooking surface further adds to the efficiency of the oven.

Surrounding the dome 12 is an outer wall 38 made of brick or any other suitable structural material. The wall 38 has a large open area 40 in front of the entrance way 33 to the cooking region itself, and the wall 38 extends alongside the dome 12 and behind it. The height of the wall 38 is greater than the exterior height of the dome 12, and a cover 39, which preferably consists of a number of relatively narrow slats, to be removable if necessary, rests on the edges of the wall 38 to enclose the dome 12. The dome 12 may be made of fire brick instead of pre-cast refractory material although the latter greatly simplifies construction. Insulating material is placed in the space between the outer surface of the dome 12 and the inner surfaces of the wall 38 and the cover 39. This insulating material may include a ceramic fiber blanket 41 (FIG. 2) placed directly over the dome 12. Further insulating material is provided in the form of Vermiculite 42, for example, to fill the space between the blanket 41 and the wall 38 and beneath the cover 39. The insulation permits the oven to be safely installed in a building.

The cross sectional view of the oven in FIG. 2 shows the flattened hemispherical shape of the dome 12. In fact, the dome is not necessarily even a perfect hemisphere of an oblate spheroid; the walls of the dome 12 may extend straight up several inches from the lower edge 21 before curving over to form the upper part of the dome. Typical dimensions for the dome 12 are a maximum internal diameter of four feet, a dome wall thickness of 4 ½ inches, a maximum internal height of 20 inches at the bottom of the plug 22, a height of 10 to 15 inches, and a depth of two inches for the groove 28. A suitable thickness of the ceramic fiber blanket is 1 ½ inches. A suitable thickness of the base 11 is five inches. The wall 38 may be 40 inches high and the cover slabs 39 may be 4 ½ inches thick. All of these dimensions are to be considered merely as illustrative of a satisfactory embodiment and not as limitations of the scope of the invention.

The base 11, which may be formed at the site of the oven, may consist of a refractory material known as Moldit "D" with metal fibers dispersed in it. The sectors making up the dome 12 may be formed of the same material as the base 11. In accordance with this invention these sectors are molded at a ceramic refractory and brought in finished form to the oven construction site to be assembled there. This is far easier than attempting to mold the dome 12 in one piece at a ceramic refractory and transporting it to the oven site without cracking it.

The side view in FIG. 2 makes it easy to see that if the burning fuel, such as logs, is banked up against the wall of the dome around the edge of the cooking surface 29, the relatively low dome 12 will hold the heat in and will force the hot combustion gases to travel generally horizontally over the cooking surface 29. A measure of the efficiency of an oven with the dimensions just given is that its use to cook such foods as hamburgers, hot dogs and pies similar to pizzas required the use of logs costing only about $120 per month as compared with a fuel bill of over $1000 per month to cook the same foods in conventional gas apparatus.

FIG. 3 shows a plan view of the same structure as in FIG. 2. Therefore, the same dimensions are applicable. In addition FIG. 3 shows that the included angle in each of the sectors in the dome 12 is 45°. As shown in FIG. 3, the wall 36 is formed as an extension of the sector 14. The wall 34 is formed as an extension of another sector 43, and additional sectors 44–47 that were not visible in FIG. 1 are shown. All of the sectors in FIG. 3 are shown as having double convolutions at their edges instead of the simple tongue and groove edges shown in FIG. 1. The double convolutions help to join the edges together airtight.

FIG. 4 shows a simplified embodiment of an oven according to this invention. The oven in FIG. 4 includes a dome 48 of generally similar configuration to the dome 12 in FIGS. 1-3 but of smaller size than the dome 12. The dome 48 is mounted on a base 49, and both the dome and the base are made of refractory materials. An entrance way 50 and a flue 51 are provided in similar spatial relationship to each other as the entrance way 33 and the flue 32 in FIGS. 1 and 2. A door 52 covers the entrance way 50 in a manner similar to the closure 37 in FIGS. 1-3. The smaller size of the dome 48 and the base 49 permits the oven in FIG. 4 to be portable. It can be supported on three legs 53–55, two of which have wheels 56 and 57 to facilitate moving the oven around. It is thus suitable for use as a backyard cooking device to take the place of present grills, but at a great increase in efficiency.

What is claimed is:

1. An oven comprising:
    a base comprising a substantially flat cooking surface for receiving food to be cooked and burning solid fuel on different areas of the cooking surface;
    a dome comprising a plurality of separate fire-resistant sectors each defined by edges extending outwardly and curved downwardly from a narrow end to a large end, the edges comprising convolutions that interfit with abutting edges of adjacent sectors, fire-resistant mortar joining the abutting edges together to form a substantially air-tight seam between them, and a central plug at the top of the dome sealed to the narrow end of each of the sectors by the fire-resistant mortar, the large ends of a plurality of the sectors forming an edge resting on the base;

only a single opening in the dome, the lower edge of the opening being defined by the base and the upper edge of the opening being below the level of the top of the dome;

walls forming an entranceway around the main opening and extending outwardly from the dome;

a flue extending upwardly from the entranceway walls and in front of the outermost part of the opening so that combustion products from burning solid fuel on the cooking surface under the dome will travel substantially horizontally in the space defined by the cooking surface and the dome to escape through the opening to the flue; and a closure attached to at least one of the entranceway walls and movable to a first position covering the entranceway for placing the fuel and food directly on the different areas of the cooking surface.

2. The method of making an oven comprising the steps of:

casting refractory fire-resistant sectors of a hemispherical dome, each sector being defined by a small end and a large end and hemispherically longitudinal edges between the large end and the small end;

casting a substantially flat refractory base to form a cooking surface for simultaneously receiving food to be cooked and burning solid fuel on different areas of the cooking surface;

assembling a plurality of the sectors to form a dome with only a single opening in a limited region of the lower portion thereof adjacent the base, said single opening serving as an access opening for the food and solid fuel and also comprising the only egress opening for the discharge of combustion products from said oven; and sealing the abutting edges of the sectors together with fire-resistant mortar.

3. The method of claim 2 comprising the additional step of forming a groove in the base to receive the edge of the large end of each of the sectors and to permit the sectors to slide circumferentially in the groove to move the hemispherically longitudinal edges into abutment.

* * * * *